C. W. FINLEY.
CONDUIT BUSHING.
APPLICATION FILED MAR. 28, 1917.
1,312,901.
Patented Aug. 12, 1919.
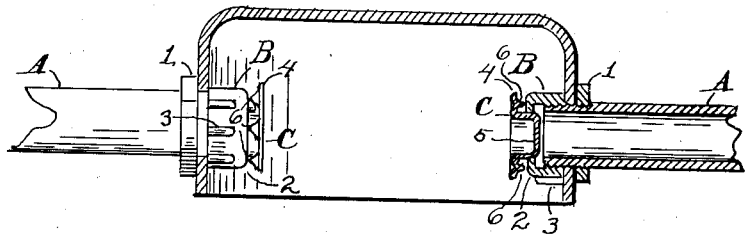
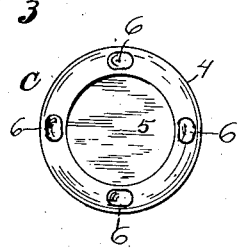
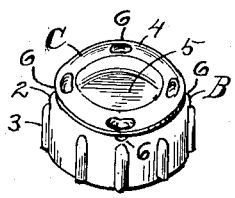
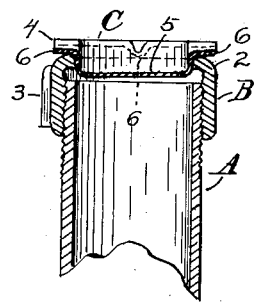
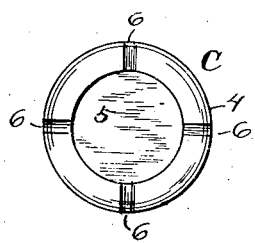
WITNESSES,
INVENTOR.
Charles W. Finley
By Victor E. Randall

UNITED STATES PATENT OFFICE.

CHARLES W. FINLEY, OF BATTLE CREEK, MICHIGAN.

CONDUIT-BUSHING.

1,312,901.　　　　　Specification of Letters Patent.　　Patented Aug. 12, 1919.

Application filed March 28, 1917. Serial No. 157,953.

*To all whom it may concern:*

Be it known that I, CHARLES W. FINLEY, a citizen of the United States, residing at Battle Creek, in the county of Calhoun and State of Michigan, have invented certain new and useful Improvements in Conduit-Bushings, of which the following is a specification, the principles of the invention being therein explained and the best mode I have contemplated for applying that principle, so as to distinguish it from other inventions for a similar purpose.

This invention relates to conduit bushings and more particularly refers to bushings employed for securing the ends of wiring conduits in outlet and junction boxes, and among other objects the invention contemplates providing a cover formed with an indented rim by which the same may be prevented from seating on the bushing, to the end that the cover may be readily removed from the bushing. To these ends the present invention consists in the combination and arrangements of the parts as will hereinafter be more fully described, shown in the accompanying drawing and defined in the appended claims, it being understood that changes in the form, proportion, size, material and minor details may be resorted to without departing from or sacrificing any of the advantages of the invention.

In the drawings, Figure 1 is a perspective view of my improved bushing cover assembled with its bushing or collar.

Fig. 2 is a vertical elevation of a conduit junction box in cross section with attached conduits having my improved bushings fitted thereto, one of said conduits and its bushing being shown in longitudinal section.

Fig. 3 is a plan view of the bushing cover.

Fig. 4 is another embodiment of my improved conduit bushing in cross section, attached to a conduit.

Fig. 5 is a plan view of the cover shown in Fig. 4.

Like marks of reference refer to corresponding or equivalent parts in the different views in which A, represents tubular conduits, threaded to receive the bushings B; C, represents caps or covers fitting within the open free ends of said collars; and D, represents a junction box as ordinarily employed, and through the holes in the rimmed side thereof said conduits are received.

In Fig. 2, the conduits A are fitted with their threaded extremities in the sides of the junction box D, jam nuts, as 1, being screw-threaded over the conduits and forming localizing shoulders for the conduits outside of said box. Within the box and screw-threaded over the free ends of said conduits, the collars or bushings B are fitted. These bushings need not necessarily differ from bushings for a like purpose generally in use, and as herein shown, are formed with a rounded rim-nosing 2 at the end opposite to the interiorly screw-threaded extremities, and they are provided with operating lugs 3, that the same may be readily screwed on or unscrewed from the conduits A by means of a wrench, chisel or other implement.

Within and over the free ends of the bushings B, the covers C are fitted. These covers preferably are of sheet metal formed with outwardly-flaring horizontally-disposed rim portions 4 and vertical sided depressions 5, the rim portions at intervals on their under surfaces being formed with depending lugs 6 extending sufficiently below the surface of the rims to form legs or stops adapted to seat on the curved indrawn ends 2 of the bushings when placed thereover, by which means a groove between the rims and the bushings is formed, so that a screwdriver, chisel, knife or other instrument may be inserted for the purpose of prying the covers free from their bushings.

The lugs 6 may be formed by indenting the rims 4 at intervals of their circumference to make round pointed depressions between the rim edges of the covers and their depressed centers 5, as in Figs. 1, 2 and 3, or they may be formed by depressing the rims in radial lines crosswise thereof, as shown in Figs. 4 and 5, the resultant depressions forming lugs having the same general effect, *i. e.*, elevating the rim of the cover above the rounded edge of the bushing to admit of the easy reception of some instrument by which said cover may be readily unseated.

In forming the covers C, the central depressions 5 are sunk sufficiently below the lugs 6 to admit of said depressions fitting snugly within and below the rounded free ends 2 of the bushings B on which said lugs are adapted to seat.

It will be obvious from the description set forth, that I have provided a bushing of exceedingly simple and compact form as well as one having certain meritorious features and capable of being manufactured at a minimum expense.

From the foregoing description taken in connection with the drawing, a more extended description of the operation and advantages of my invention is believed unnecessary.

Having, therefore set forth my invention, what I claim as new and desire to secure by Letters Patent, is:

1. In a device of the class set forth, the combination with a collar screw-threaded internally at one end thereof and formed with an indrawn open opposite end, and a cover having an outwardly flaring rim provided with lugs resting upon the indrawn end of said collar and a depressed central portion fitting therein.

2. In a device of the class set forth, the combination with a collar having exteriorly operating means, and formed with an internally screw-threaded surface opening at one end and an internally rounded opposite end, and a cover having an outwardly-disposed rim with lugs seating on the rounded end of said collar and formed with a depressed portion fitting within the indrawn open end of said collar.

3. In a device of the class set forth, the combination with a collar having exterior longitudinal lugs and formed with an internally screw-threaded surface opening at one end and internally-rounded surface at its opposite end, and a cover having an outwardly-flaring rim and a depressed contral portion fitting within the open rounded end of said collar, said rim formed with depending lugs seating on the rounded open end of said collar and forming a groove between said collar and rim for the purpose of inserting an instrument.

4. In a device of the class described, the combination with a collar screw-threaded at one end thereof and formed at its opposite end with an inturned flange, and a cover having an out-turned rim with lugs thereon resting upon the rounded end of said collar, a depressed portion of said cover fitting within the flange.

5. In a device of the class described, the combination with a collar screw-threaded at one end thereof, and a cover having a depressed portion fitting snugly in the opposite end thereof, said cover having a rim provided with lugs seating upon the end of said collar to provide an annular intermittently broken space between said collar and the cover and its rim.

6. In a device of the class described, the combination with a collar internally screw-threaded at one end thereof, and a cover having a depressed portion fitting within the opposite end thereof, said cover having an outwardly-extending rim provided with lugs formed by indenting or drawing the metal of said rim, said lugs adapted to seat on the end of said collar providing spaces between said collar and rim.

7. In a device of the class described, the combination of a collar provided with an inturned flange at one end, and a cover fitting within said flange and having an out-turned rim provided with lugs resting thereon, for the purpose specified.

8. In a device of the class set forth, the combination of a collar threaded at one end, and a cover fitting within the other end of said collar, and having an out-turned rim provided with spacing lugs engaging the end of said collar, for the purpose specified.

CHAS. W. FINLEY.

Witnesses:
 MILLARD FISH,
 NELLIE WOODWARD.